US009601019B2

United States Patent
Kim et al.

(10) Patent No.: US 9,601,019 B2
(45) Date of Patent: Mar. 21, 2017

(54) CLEANING ROBOT AND METHOD FOR CONTROLLING THE SAME

(71) Applicant: SAMSUNG ELECTRONICS CO., LTD., Suwon-si, Gyeonggi-do (KR)

(72) Inventors: In Joo Kim, Suwon-si (KR); Dong Min Shin, Suwon-si (KR); Shin Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 112 days.

(21) Appl. No.: 14/282,464

(22) Filed: May 20, 2014

(65) Prior Publication Data
US 2015/0032259 A1    Jan. 29, 2015

(30) Foreign Application Priority Data

Jul. 29, 2013 (KR) .................. 10-2013-0089352

(51) Int. Cl.
*A47L 11/40* (2006.01)
*G08G 1/16* (2006.01)
(Continued)

(52) U.S. Cl.
CPC .............. *G08G 1/16* (2013.01); *A47L 9/2805* (2013.01); *A47L 9/2852* (2013.01);
(Continued)

(58) Field of Classification Search
CPC ............ A47L 2201/04; A47L 2201/00; G05D 2201/0215
See application file for complete search history.

(56) References Cited

U.S. PATENT DOCUMENTS

2004/0076324 A1* 4/2004 Burl .................... G05D 1/0246
382/153
2004/0207355 A1* 10/2004 Jones .................. G05D 1/0219
318/568.12
(Continued)

FOREIGN PATENT DOCUMENTS

WO    WO 2006/089307    8/2006

OTHER PUBLICATIONS

European Search Report issued Jan. 29, 2015 in corresponding European Patent Application No. 14178376.1.

*Primary Examiner* — Khoi Tran
*Assistant Examiner* — Ryan Rink
(74) *Attorney, Agent, or Firm* — Staas & Halsey LLP

(57) ABSTRACT

A cleaning robot includes a non-circular main body, a moving assembly mounted on a bottom surface of the main body to perform forward movement, backward movement and rotation of the main body, a cleaning tool assembly mounted on the bottom surface of the main body to clean a floor, a detector to detect an obstacle around the main body, and a controller to determine whether an obstacle is present in a forward direction of the main body based on a detection signal of the detector, control the rotation of the main body to determine whether the main body rotates by a predetermined angle or more upon determining that the obstacle is present in the forward direction, and determine that the main body is in a stuck state to control the backward movement of the main body if the main body rotates by the predetermined angle or less.

12 Claims, 12 Drawing Sheets

(51) Int. Cl.
*G05D 1/02* (2006.01)
*A47L 9/28* (2006.01)
(52) U.S. Cl.
CPC ........ *G05D 1/0214* (2013.01); *A47L 2201/04* (2013.01); *Y02B 40/82* (2013.01)

(56) References Cited

U.S. PATENT DOCUMENTS

| | | | |
|---|---|---|---|
| 2008/0084284 A1* | 4/2008 | Park | G05D 1/0227 340/436 |
| 2008/0276407 A1 | 11/2008 | Schnittman et al. | |
| 2011/0140829 A1* | 6/2011 | Veenstra | G05D 1/0227 340/1.1 |
| 2012/0011669 A1* | 1/2012 | Schnittman | A47L 11/34 15/52.1 |
| 2012/0036659 A1* | 2/2012 | Ziegler | A47L 5/14 15/50.1 |
| 2012/0143430 A1* | 6/2012 | Broggi | G01S 17/023 701/28 |
| 2012/0182392 A1* | 7/2012 | Kearns | B25J 11/009 348/46 |
| 2012/0291809 A1* | 11/2012 | Kuhe | A47L 5/24 134/18 |
| 2014/0259475 A1* | 9/2014 | Doughty | A47L 9/0477 15/52.1 |
| 2015/0197012 A1* | 7/2015 | Schnittman | G05D 1/0227 700/250 |

* cited by examiner

CLEANING ROBOT AND METHOD FOR CONTROLLING THE SAME

CROSS-REFERENCE TO RELATED APPLICATIONS

This application claims the benefit of Korean Patent Application No. 10-2013-0089352, filed on Jul. 29, 2013 in the Korean Intellectual Property Office, the disclosure of which is incorporated herein by reference.

BACKGROUND

1. Field

One or more embodiments relate to a cleaning robot for improving traveling performance and a method for controlling the same.

2. Description of the Related Art

A cleaning robot is a device which automatically cleans an area to be cleaned by suctioning foreign substances such as dust from the floor while autonomously traveling about a cleaning area without a user intervention.

A general cleaning robot may perform cleaning of a floor by a dry cleaning method of suctioning dust from the floor.

Recently, there has been developed a cleaning robot having a pad mounted on the bottom of a main body to perform wet cleaning by washing the floor with water as well as a cleaning robot capable of performing dry cleaning by suctioning dust.

This cleaning robot repeatedly may perform a cleaning operation by using a cleaning tool while traveling about a cleaning area. In this case, the cleaning robot may perform cleaning while detecting an obstacle or wall located in the cleaning area through various sensors and the like, and controlling a traveling and cleaning operation based on the detection results.

Traveling technology of the cleaning robot may be classified into complete coverage technology for quickly and thoroughly cleaning a target, and escape technology to enable the cleaning robot to escape from an unusual situation such as a stuck state in which a main body may not move due to an obstacle or the like.

Escape technology is used when a preset map is different from the actual environment, or the environment suddenly changes and, as such, the cleaning robot may not move through a calculated path. In accordance with this technology, the cleaning robot may bypass an obstacle by using a sensor provided in the main body.

As mentioned above, the cleaning robot may perform a basic operation to avoid an obstacle through bypass when recognizing the obstacle, but the main body may fail to move when lodged in a confined space.

SUMMARY

The foregoing described problems may be overcome and/or other aspects may be achieved by one or more embodiments of a cleaning robot in which the size of a main body is different from the size of a rotation space required for rotation of the main body, and a method for controlling the same.

The foregoing described problems may be overcome and/or other aspects may be achieved by one or more embodiments of a cleaning robot which may determine whether the main body is in a stuck state by rotating the main body by a predetermined angle upon detection of an obstacle when traveling, and may perform backward movement to escape from the stuck state upon determining that the main body is in the stuck state, and a method for controlling the same.

The foregoing described problems may be overcome and/or other aspects may be achieved by one or more embodiments of a cleaning robot which may determine whether the main body is in a stuck state by using a detector on front and side surfaces of the main body upon detection of an obstacle when traveling, and may perform backward movement to escape from the stuck state upon determining that the main body is in the stuck state, and a method for controlling the same.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a cleaning robot may include a main body having a non-circular shape, a moving assembly that may be mounted on a bottom surface of the main body to possibly perform forward movement to move the main body in a first direction that may be a traveling direction of the main body, backward movement to move the main body in a second direction opposite to the first direction, and rotation to rotate the main body within a predetermined range to change the traveling direction of the main body, a cleaning tool assembly that may be mounted on the bottom surface of the main body to clean a floor, a detector that may detect an obstacle around the main body, and a controller that may determine whether an obstacle is present in front of the main body in the traveling direction based on a detection signal of the detector, control the rotation of the main body to possibly determine whether the main body rotates by an angle equal to or greater than a predetermined angle upon determining that the obstacle is present, and determine that the main body is in a stuck state to possibly control the backward movement of the main body if the main body rotates by an angle less than the predetermined angle.

The cleaning robot according to one or more embodiments may further include a plurality of bumpers that may be respectively mounted on front and rear surfaces of the main body to possibly mitigate impact upon collision with an obstacle. The detector may be mounted on the front and rear surfaces of the main body to possibly detect collision between the obstacle and the plurality of bumpers. The controller may determine that the main body is in a stuck state upon receiving a collision detection signal from the detector when controlling the rotation of the main body.

The controller may control periodic rotation of the main body by a predetermined angle to possibly determine whether the main body may be escapable when controlling the backward movement of the main body.

The controller may determine that the main body may be in an escapable state if a detection signal from the detector is not received when controlling the rotation of the main body by the predetermined angle to possibly determine whether the main body is escapable.

The controller may control rotation of the main body by a predetermined angle to possibly determine whether the main body may be escapable when controlling the backward movement of the main body.

The detector may be mounted on at least one of front, left side, right side and rear surfaces of the main body. When controlling the rotation of the main body by the predetermined angle, the controller may control the forward movement of the main body if an obstacle is detected by the detector mounted on the rear surface of the main body, and control the backward movement of the main body if an obstacle is detected by the detector mounted on the front surface of the main body.

The detector may include a rotation detector that may detect a rotation angle of the main body, and the controller may compare the predetermined angle with the rotation angle that may be detected by the rotation detector and may determine whether the main body is in the stuck state.

A size of the main body may be less than a size of a rotation space required for rotation.

In accordance with one or more embodiments, a cleaning robot may include a main body that may have a non-circular shape, a moving assembly that may be mounted on a bottom surface of the main body to possibly move the main body, a cleaning tool assembly that may be mounted on the bottom surface of the main body to possibly clean a floor, a detector to possibly detect whether the main body is in a stuck state of being stuck in an internal space formed in an obstacle, and a controller that may control the moving assembly such that the main body may travel in a direction opposite to a direction when entering into the internal space formed in the obstacle upon determining that the main body is in the stuck state based on a detection signal of the detector.

A size of the main body may be less than a size of a rotation space required for rotation.

The detector may include a distance detector that may detect a distance to an obstacle, and at least one collision detector to possibly detect collision with an obstacle on each of front and rear surfaces of the main body. The controller may determine whether an obstacle is present in a forward direction based on a detection signal detected by the distance detector, rotate the main body by a predetermined angle if the obstacle is present in the forward direction, and determine that the main body is in a stuck state upon receiving a detection signal from the at least one collision detector.

The detector may include at least one collision detector to possibly detect collision with an obstacle on each of front and rear surfaces of the main body. The controller may determine whether an obstacle is present in a forward direction based on a detection signal detected by the collision detector of the front surface of the main body, rotate the main body by a predetermined angle if the obstacle is present in the forward direction, and determine that the main body is in a stuck state upon receiving a detection signal from the collision detector of the front and rear surfaces.

The detector may include an obstacle detector that may be mounted on a front surface of the main body, and a rotation detector that may be provided in the main body. The controller may control rotation of the main body by a predetermined angle upon receiving a detection signal from the obstacle detector provided on the front surface of the main body, compare the predetermined angle with a rotation angle detected by the rotation detector, and determine that the main body is in a stuck state if the predetermined angle is different from the rotation angle.

The detector may include a collision detector that may be provided on a front surface of the main body to possibly detect collision with an obstacle, and a rotation detector that may be provided in the main body. The controller may control rotation of the main body by a predetermined angle upon receiving a detection signal from the collision detector, compare the predetermined angle with a rotation angle detected by the rotation detector, and determine that the main body is in a stuck state if the predetermined angle is different from the rotation angle.

When controlling the moving assembly, the controller may control backward movement of the main body by a predetermined distance and may control rotation of the main body by a predetermined angle upon completion of the backward movement to possibly re-determine whether the main body is in a stuck state, and possibly determine whether the main body is escapable by repeating the control of re-determination.

When re-determining whether the main body is in a stuck state, the controller may determine that the main body is in an escapable state if the main body is rotatable by an angle equal to or greater than a predetermined angle, and control rotation and straight movement of the main body to bypass the obstacle.

When controlling the backward movement, the controller may control backward movement of the main body by a predetermined distance after rotating the main body by a predetermined angle in a direction opposite to a direction in which the main body is rotated by the predetermined angle to possibly determine whether the main body is in a stuck state.

The detector may include obstacle detectors that may be mounted on front, left side and right side surfaces of the main body. The controller may calculate a lateral distance of the internal space formed in the obstacle based on obstacle detection signals detected by obstacle detectors that may be provided on the left and right side surfaces upon receiving an obstacle detection signal from the obstacle detector that may be provided on the front surface of the main body, compare the calculated distance of the internal space formed in the obstacle with a preset diameter of a rotatable space, and determine that the main body is in a stuck state if the distance of the internal space formed in the obstacle is shorter than the diameter of the rotatable space.

When controlling the moving assembly, if the controller controls backward movement of the main body, the controller may stop the backward movement of the main body when the detection signals are not received from the obstacle detectors that may be provided on the left and right side surfaces of the main body, and control rotation and straight movement of the main body to possibly bypass the obstacle.

In accordance with one or more embodiments, a method for controlling a cleaning robot including a main body having a non-circular shape may include determining whether an obstacle is present in front of the main body in a traveling direction while performing traveling and cleaning, determining whether the main body is in a stuck state of being stuck in an internal space formed in an obstacle upon determining that the obstacle is present, and moving the main body backward in a direction opposite to the traveling direction of the main body to perform an attempt to escape from the internal space formed in the obstacle upon determining that the main body is in the stuck state.

The determining whether the main body is in the stuck state may include rotating the main body by a predetermined angle, detecting an obstacle located in forward and backward directions of the main body, and determining that the main body is in the stuck state if the obstacle is located in the forward and backward directions of the main body.

The detecting the obstacle may include detecting at least one of a contact with the obstacle and a distance to the obstacle.

The performing the attempt to escape may include rotating the main body by a predetermined angle in a first direction, determining that the main body is in a stuck state and is not escapable if an obstacle is detected in the forward and backward directions of the main body, determining that the main body is in an escapable state if no obstacle is detected in at least one of the forward and backward directions of the main body, and controlling bypass traveling if the main body is in the escapable state.

The determining whether the main body is in the stuck state may include detecting an obstacle by using a detector that may be provided on left and right side surfaces of the main body, determining whether an obstacle is located in a lateral direction of the main body, acquiring a distance to the obstacle located in the lateral direction upon determining that the obstacle is located in the lateral direction of the main body, calculating a size of the internal space formed in the obstacle based on the acquired distance, and determining whether the main body is in the stuck state by comparing the calculated size of the internal space formed in the obstacle with a size of a rotatable space of the main body.

The performing the attempt to escape may include moving the main body backward by a predetermined distance, detecting an obstacle by using the detector provided on left and right side surfaces of the main body, determining whether an obstacle is located in the lateral direction of the main body to possibly determine whether the main body is in an escapable state, and performing rotation and straight movement of the main body to bypass the obstacle upon determining the main body is in the escapable state.

The determining whether the main body is in the stuck state may include rotating the main body by a predetermined angle, detecting a rotation angle of the main body when the main body is rotated, comparing the predetermined angle with the detected rotation angle, and determining that the main body is in the stuck state if the predetermined angle is different from the detected rotation angle.

According to one or more embodiments, the cleaning robot may escape from a confined space by performing continuous backward movement in a situation in which the main body fails to move.

It may be determined whether the cleaning robot is in a stuck state by utilizing a small number of sensors, and the cleaning robot may bypass an obstacle while performing backward movement in the stuck state, thereby possibly improving traveling performance and reducing manufacturing costs.

Accordingly, it may be possible to improve cleaning performance and a user's satisfaction.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
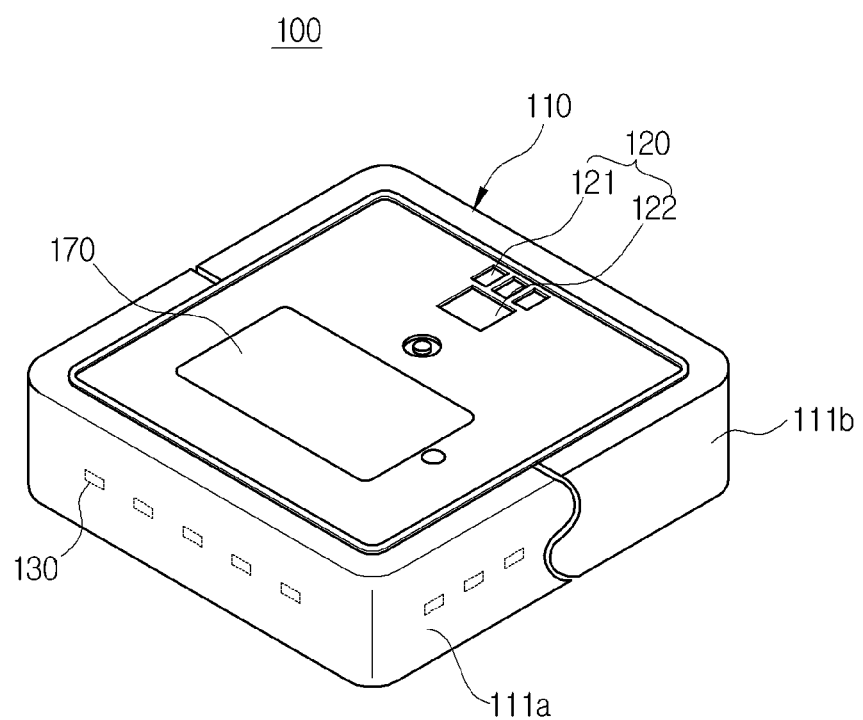
FIG. 1 is a top perspective view of a cleaning robot according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 2:
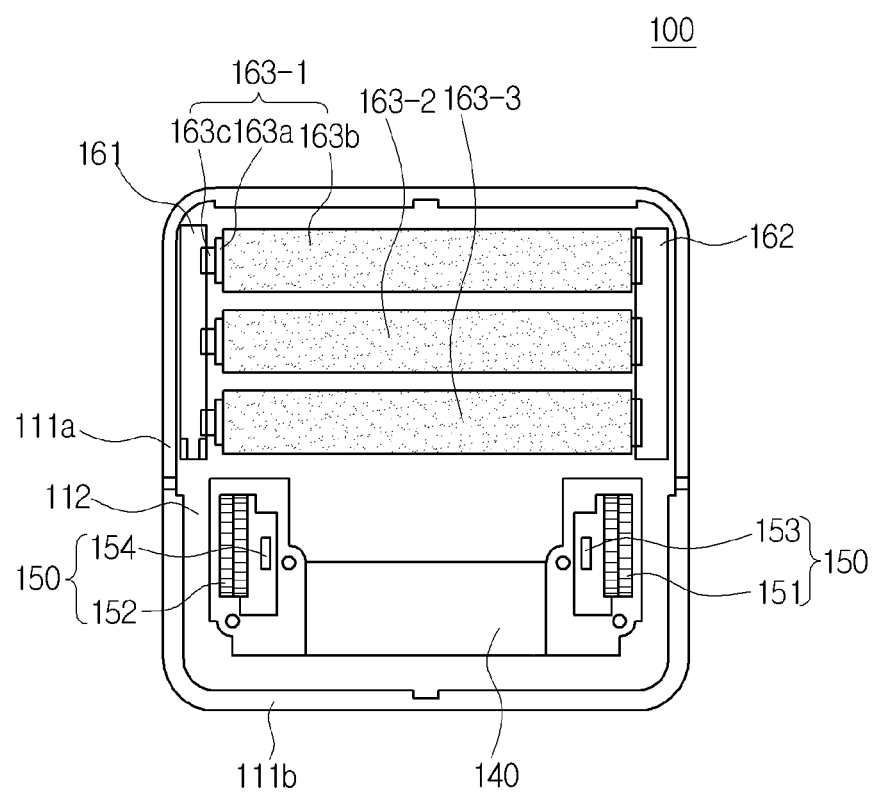
FIG. 2 is a bottom view of a cleaning robot according to one or more embodiments.
Figure 3:
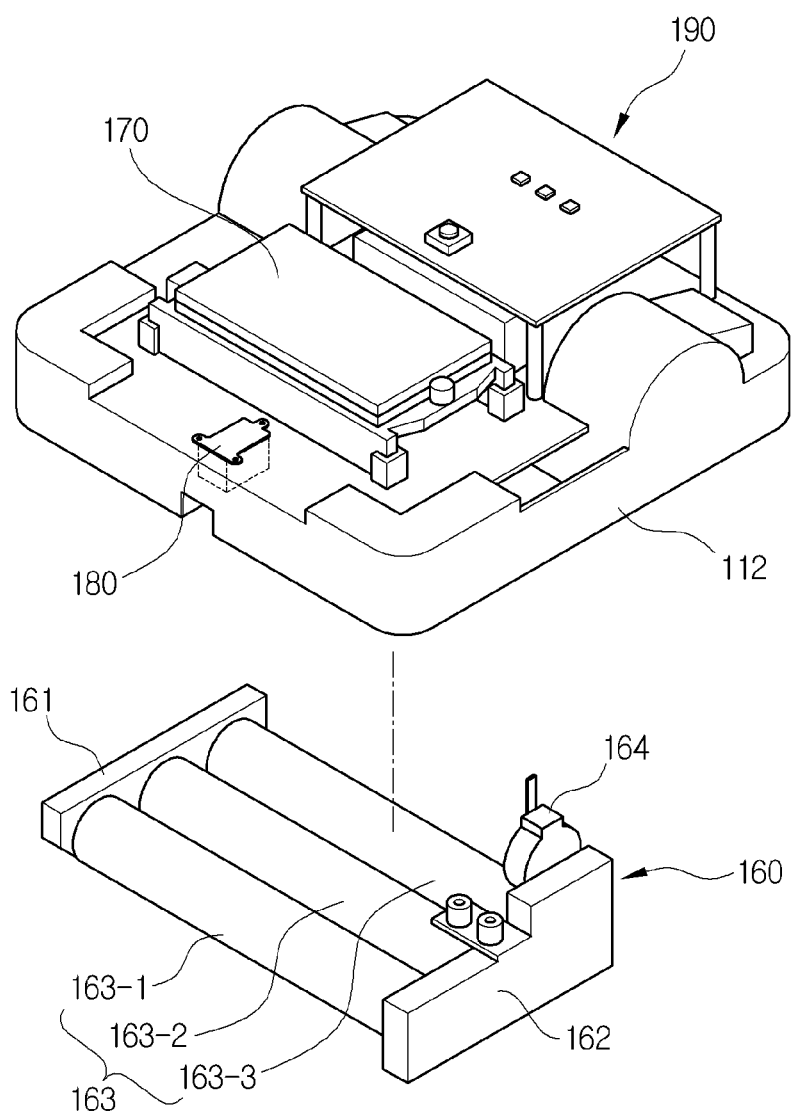
FIG. 3 is an exploded perspective view of a cleaning robot according to one or more embodiments.

FIG. 1 is a top perspective view of a cleaning robot according to one or more embodiments, FIG. 2 is a bottom view of a cleaning robot according to one or more embodiments, and FIG. 3 is an exploded perspective view of a cleaning robot according to one or more embodiments.

A cleaning robot 100 may perform cleaning by wiping foreign substances such as dust on the floor while autonomously traveling about a cleaning area in the home when a cleaning command is input by a user, or at a cleaning reservation time.

When a cleaning end command is input by the user, when it may be determined that cleaning has been completed, or when remaining battery charge falls below a reference level, the cleaning robot 100 may perform charging by performing docking with a recharging base (not shown), and receiving power from the recharging base (not shown) when docking is completed.

In this case, the recharging base (not shown) may include a transformer connected to an external commercial AC power source to convert commercial AC power supplied from the external commercial AC power source, a rectifier to half-wave rectify or full-wave rectify the converted power, a smoothing unit to smooth the rectified power, and a voltage adjusting unit to output the smoothed power as DC power with a constant voltage. The recharging base may supply the DC power output by the voltage adjusting unit to the cleaning robot 100 through a power terminal.

Further, the recharging base (not shown) further may include a docking communication unit (not shown) to transmit/receive a docking signal for docking with the cleaning robot 100 to/from the cleaning robot 100.

one or more embodiments may be applied to a dry or wet cleaning robot, but the following description will be given only in conjunction with a wet cleaning robot.

As shown in FIG. 1, the cleaning robot 100 may include a main body 110 having a non-circular shape such as an oval or polygonal shape to form the outer appearance, a user interface 120 mounted on the upper part of the main body 110 to receive operation information and reservation information or the like and display operating information, and an obstacle detector 130 to detect obstacle information in the cleaning area.

More specifically, the user interface 120 may include an input unit 121 to receive, for example, cleaning reservation information and operation information or the like, and a display unit 122 to display, for example, the cleaning reservation information, a charging state, information about the water level of a water tank, an operation mode and the like. In this case, the operation mode may include, for example, a cleaning mode, a standby mode, a docking mode and the like.

The detector 130 may include an obstacle detector to detect a distance to an obstacle as well as collision with an obstacle, and the presence or absence of an obstacle. The cleaning robot may include at least one detector 130 mounted on front, left and/or right side surfaces of the main body 110 to detect an obstacle located in the forward direction or lateral direction of the main body.

In addition, the detector 130 may include at least one detector mounted on the rear surface of the main body 110.

The detector 130 may include a distance detector, for example, a laser, ultrasonic, infrared (IR), or radio frequency (RF) distance detector or the like, and/or a collision detector based on physical contact, such as a micro switch.

As shown in FIGS. 1 and 2, the main body 110 of the cleaning robot 100 may be formed in an oval or polygonal shape rather than a circular shape, and may include a first bumper 111*a* mounted on the front side of the main body 110 to possibly mitigate the impact during collision with the obstacle, and a second bumper 111*b* mounted on the rear side of the main body 110 to possibly mitigate impact during collision with the obstacle. The main body 110 further may include a frame 112 upon which a power supply unit, a moving assembly, a cleaning tool assembly, a drive module and the like may be mounted.

In this case, when a direction in which the main body moves for cleaning is a forward traveling direction, the front surface of the main body is a surface located at the front side when traveling in the forward direction, and the rear surface of the main body is a surface located at the rear side when traveling in the forward direction.

As shown in FIG. 2, the cleaning robot 100 may include a power supply unit 140 to supply power for driving to each component, a moving assembly 150 that may be installed on the rear bottom surface of the main body 110 to move the main body 110, and a cleaning tool assembly 160 that may be provided on the front bottom surface of the main body 110 to possibly wet-clean foreign substances such as dust on the floor.

As shown in FIG. 3, the cleaning robot 100 may include a water supply unit 170 to supply water to the cleaning tool assembly, a moisture detector 180 to detect the amount of moisture of pads of the cleaning tool assembly, and a drive module 190 to drive the moving assembly 150, the cleaning tool assembly 160, the water supply unit 170 and the moisture detector 180 by using power supplied from the power supply unit 140.

The power supply unit 140 may include a battery which may be electrically connected to various components 120, 130, 140, 150, 160 and 170 mounted on the main body 110 to supply driving power to various components.

In this case, the battery may be a rechargeable secondary battery, which may be electrically connected to the recharging base (not shown) through two charging terminals (not shown) and receives power from the recharging base (not shown) to perform charging.

The moving assembly 150 may include a pair of wheels 151 and 152 that may be installed rotatably at the left and right edges of the rear area of the main body 110 to rotate and move the main body 110 forward or backward, and wheel motors 153 and 154 to apply driving force to the wheels 151 and 152. In this case, the wheels 151 and 152 may be arranged symmetrically with each other.

Forward movement may involve moving the main body in the forward direction by rotating two wheel motors at the same speed in a first direction, that is, a traveling direction. Backward movement may involve moving the main body in the backward direction by rotating two wheel motors at the same speed in a second direction (counter-traveling direction) opposite to the first direction. Rotation may involve rotating the main body by a predetermined angle within a predetermined range by rotating two wheel motors at different speeds. That is, the main body has a traveling direction different from the first direction and the second direction during rotation.

Further, in forward and backward movement, since the cleaning robot moves straight in a non-rotating state of the main body, only the moving distance is changed without changing the orientation. In rotation, since the cleaning robot rotates about the center of the main body, the orientation of the cleaning robot may be changed without change in position.

The cleaning tool assembly 160 may be provided on the front bottom surface of the main body 110, and may wet-clean dust on the floor below the main body 110.

As shown in FIGS. 2 and 3, the cleaning tool assembly 160 may include jig members 161 and 162 that may be mounted on the front left and right sides of the frame 112 of the main body 110, and at least one drum type pad member 163 that may be detachably coupled between two jig members 161 and 162. In this case, the drum type pad member 163 may be implemented, for example, using a single pad member or multiple pad members.

The cleaning tool assembly 160 further may include a gear member 164 for rotating a plurality of drum type pad members 163-1, 163-2 and 163-3.

Each of the plurality of drum type pad members 163-1, 163-2 and 163-3 may include a drum 163*a*, a pad 163*b* that may be detachably mounted on the outer surface of the drum 163*a* and in contact with the floor to wash the floor, and protruding parts 163*c* that may be formed at both ends of the drum 163*a* to protrude outwardly from both ends and inserted and that may be coupled between the jig member 161 and the jig member 162.

The drum type pad members 163-1, 163-2 and 163-3 may be arranged continuously in the backward direction with respect to the traveling direction of the main body. Accordingly, the second drum type pad member 163-2 and the third drum type pad member 163-3 may sequentially pass, in an overlapping manner, a position to which the first drum type pad member 163-1 moves.

That is, the cleaning robot 100 may repeatedly clean one position by using the plurality of drum type pad members 163-1, 163-2 and 163-3.

The pad 163*b* may be separated from the drum 163*a* for replacement.

The pad 163*b* may be formed to protrude outwardly from the main body 110 in order to possibly ensure a sufficient frictional force with the floor. In this case, the pad 163*b* may be formed to protrude downwardly from two wheels 151 and 152.

Further, the drum type pad members 163-1, 163-2 and 163-3 may be rotated clockwise or counter-clockwise.

Further, the plurality of drum type pad members 163-1, 163-2 and 163-3 may be connected to different gear members, respectively, and may be rotated in different directions and at different rates of rotation.

The water supply unit 170 may be disposed on the frame 112 to supply water to at least one drum type pad member among the first drum type pad member 163-1, the second drum type pad member 163-2 and the third drum type pad member 163-3.

The water supply unit 170 may include a water tank, a pump, and a flow path member, and may further include a water level detector to detect the amount of water in the water tank.

The moisture detector 180 may be implemented by at least one detector to detect the amount of moisture remaining in at least one drum type pad member among the drum type pad members 163-1, 163-2 and 163-3 of the cleaning tool assembly 160.

The cleaning robot 100 may further include a pad detector (not shown) for detecting whether the pad of the cleaning tool assembly is mounted. In this case, the pad detector may be implemented by using an optical sensor or micro-switch installed adjacent to the cleaning tool assembly.

Further, in the case of a dry cleaning robot, the cleaning tool assembly may include a brush to collect foreign substances on the floor instead of a pad, a motor to rotate the brush, and a dust collecting unit to collect foreign substances.

In this cleaning robot, the size of a rotation space occupied by the main body during rotation is greater than the size of the main body. Although the robot may enter an internal space formed in an obstacle, if the size of the internal space formed in the obstacle is smaller than the size of a rotatable space of the main body, the robot may be incapable of escape by rotational movement of the main body.

This will be described with reference to FIGS. 4 and 5.

Figure 4:
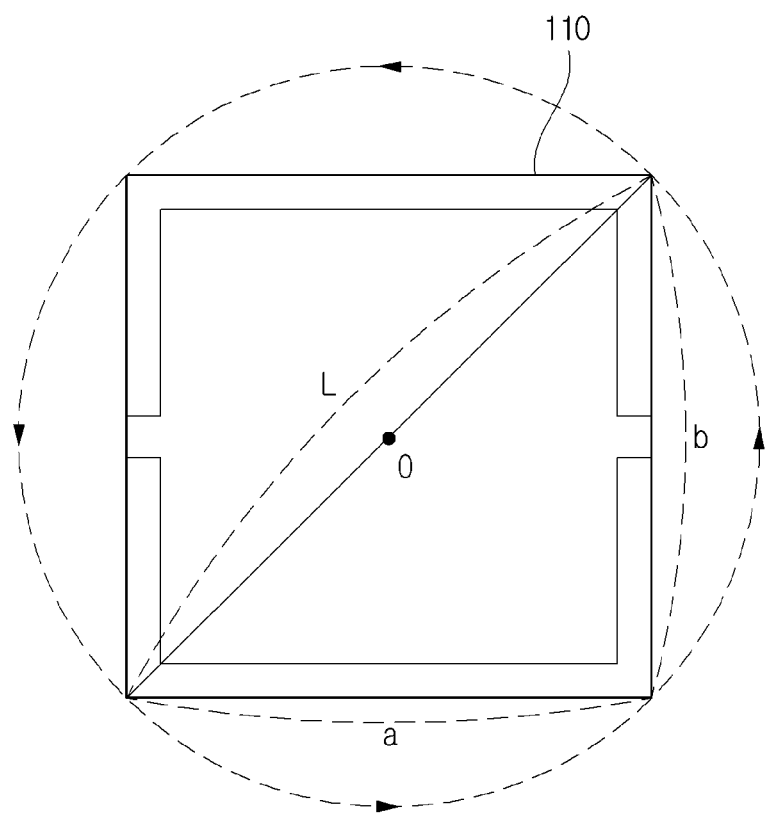
FIG. 4 is an exemplary diagram for explaining the size of a main body and the size of a rotatable space of a cleaning robot according to one or more embodiments.

As shown in FIG. 4, if the main body of the cleaning robot has a rectangular shape with sides a and b and rotates with respect to the center O, the rotation space occupied by the main body during rotation has the same size as the size of a circular space having a diameter L. That is, it can be seen that the size of the rotation space is larger than the size of the main body of the cleaning robot.

Figure 5:
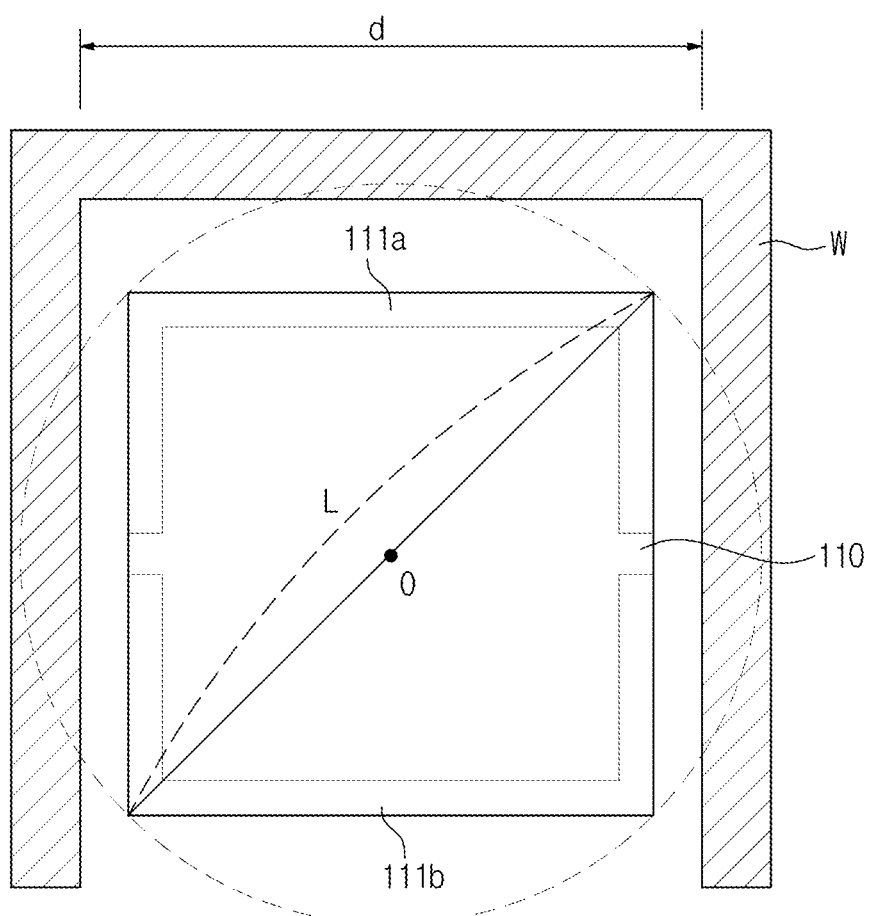
FIG. 5 is an exemplary diagram of a stuck state of a cleaning robot according to one or more embodiments.

Accordingly, as shown in FIG. 5, the cleaning robot 100 may enter an internal space formed in an obstacle W if a horizontal length a of the main body is smaller than a horizontal length d of the internal space formed in the obstacle. However, the internal space formed in the obstacle is a space where the plane corresponding to the traveling direction of the cleaning robot is closed, and the cleaning robot is no longer capable of moving forward. Further, since the length d of the internal space formed in the obstacle is shorter than the diameter L of the rotatable space of the main body, rotation of the main body is impossible. In this case, the cleaning robot may attempt to escape from the internal space formed in the obstacle using backward movement. A control configuration of the cleaning robot for such an escape process will be described.

Figure 6:
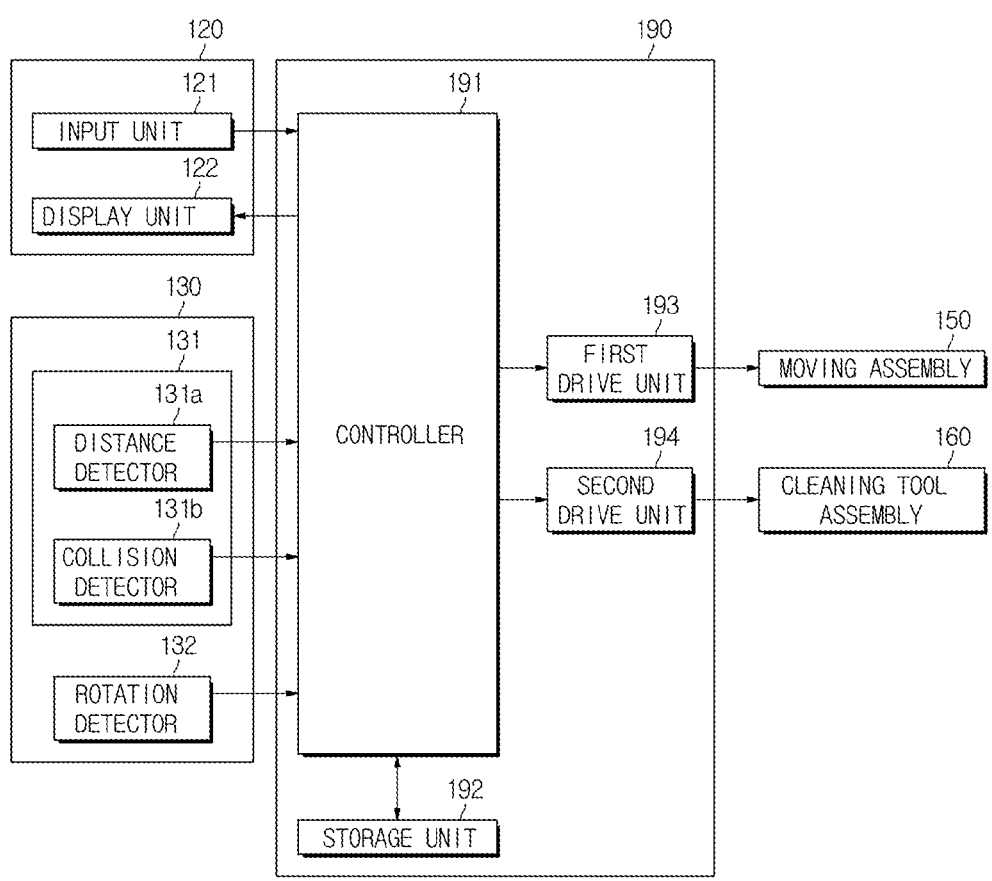
FIG. 6 shows a control configuration of a cleaning robot according to one or more embodiments.

FIG. 6 shows a control configuration of the cleaning robot according to one or more embodiments, which may include the user interface 120, the detector 130 and the drive module 190.

The user interface 120 may include the input unit 121 to receive the cleaning reservation information, cleaning start/end command and operation mode and the like, and a display unit 122 to display the cleaning reservation information, charging state information, operation mode, operating state information and the like.

The detector 130 may include an obstacle detector 131 mounted on at least one surface among the front, side and/or rear surfaces of the main body to detect an obstacle in the cleaning area. The obstacle detector may transmit a detection signal of the detected obstacle to a controller 191.

The detector 130 may include at least one of a distance detector 131a based on distance detection and/or a collision detector 131b based on collision detection.

Here, the distance detector 131a based on distance detection may include at least one detector using, e.g., laser, ultrasonic, infrared (IR) and RF waves, and the like, and the collision detector 131b based on the collision detection may include at least one detector such as a micro switch and a touch sensor and the like.

The distance detector 131a may include a plurality of detectors mounted on the front, left and/or right sides, and the collision detector 131b may include at least one detector mounted on each of a first bumper 111a and a second bumper 111b.

The detector 130 may further include a rotation detector 132 to detect an actual rotation angle of the main body 110. In this case, the rotation detector 132 may include at least one of an inertial measurement unit (IMU), a gyroscopic sensor, and an encoder and the like.

The drive module 190 may drive the moving assembly 150 and the cleaning tool assembly 160 based on a signal transmitted from the user interface 120 and the detector 130.

The drive module 190 may include the controller 191, a storage unit 192, and a plurality of drivers 193 and 194.

The controller 191 may control the moving assembly 150 and the cleaning tool assembly 160 based on random or preset map information when a cleaning command is input for execution of traveling and cleaning operations.

The controller 191 may control the moving assembly 150 based on a detection signal obtained by the detector 130 to bypass an obstacle when controlling traveling. In this case, the controller 191 may control at least one of forward movement, backward movement and rotation of the main body.

The controller 191 may determine whether the main body is in a stuck state upon detection of an obstacle in the forward direction. Upon determining that the main body is in a stuck state, the controller 191 may control the moving assembly 150 to enable the main body to escape from the internal space formed in the obstacle.

In this case, determining whether the main body is in a stuck state may be largely divided into two cases: determining whether the main body may rotate by an angle equal to or greater than a predetermined angle (1) to (4), and determining whether an obstacle is present in the forward, backward and lateral directions (5).

These may be classified according to arrangement of detectors, and will be described in more detail.

(1) When the cleaning robot 100 includes an obstacle detector mounted on the front surface of the main body, and a collision detector to detect the collision of the first bumper and the second bumper, the controller 191 may control the main body to rotate by a predetermined angle upon receiving an obstacle detection signal from the obstacle detector provided on the front surface of the main body. In this case, the controller 191 may determine that the main body is in a stuck state upon receiving a collision detection signal from the collision detector of the first bumper and the second bumper.

In addition, the controller may control the main body to rotate by an angle equal to or greater than a predetermined angle, but the main body may fail to rotate by an angle equal to or greater than a predetermined angle due to collision with the obstacle.

(2) When the cleaning robot 100 includes an obstacle detector mounted on the front surface of the main body and a rotation detector provided on the main body, the controller 191 may control the main body to rotate by a predetermined angle upon receiving an obstacle detection signal from the obstacle detector provided on the front surface of the main body. In this case, the controller 191 may compare a rotation angle detected by the rotation detector with the predetermined angle, and may determine that the main body is in a stuck state when the detected rotation angle is different from the predetermined angle.

(3) When the cleaning robot 100 includes a collision detector to detect collision of each of the first bumper and the second bumper, the controller 191 may control the main body to rotate by a predetermined angle upon receiving a collision detection signal of the first bumper from the collision detector. In this case, the controller 191 may determine that the main body is in a stuck state upon receiving both collision detection signals from the collision detector of the first bumper and the second bumper.

(4) When the cleaning robot 100 includes a collision detector to detect collision of the first bumper and a rotation detector provided on the main body, the controller 191 may control the main body to rotate by a predetermined angle upon receiving a collision detection signal of the first bumper from the collision detector. In this case, the controller 191 may compare a rotation angle detected by the rotation detector with the predetermined angle, and may determine that the main body is in a stuck state when the detected rotation angle is different from the predetermined angle.

(5) When the cleaning robot 100 includes obstacle detectors mounted on the front and side surfaces of the main body, upon receiving an obstacle detection signal from the obstacle detector provided on the front surface of the main body, the controller 191 may calculate a lateral distance of the internal space formed in the obstacle based on obstacle detection signals detected by obstacle detectors provided on both side surfaces of the main body, may compare the calculated distance of the internal space formed in the obstacle with the preset diameter of the rotatable space, and may determine that the main body is in a stuck state if the distance of the internal space formed in the obstacle is shorter than the diameter of the rotatable space.

A control configuration to perform escape will hereinafter be described in detail.

(1) The controller 191 may control the moving assembly 150 to move the main body by a predetermined distance, and may re-determine whether the main body is in a stuck state by rotating the main body by a predetermined angle upon completion of backward movement. Upon determining that the main body is in a stuck state as a result of the re-determination, a process of performing backward movement and rotation may be repeated. Upon determining that the main body is not in a stuck state by repeating the re-determination, it may be determined that the main body is in an escapable state, and rotation and forward movement may be performed to bypass the obstacle.

In addition, if the main body has been rotated by a predetermined angle in the first direction in order to determine whether the main body is in a stuck state, the controller 191 may rotate the main body by a predetermined angle in the second direction opposite to the first direction and moves the main body backward by a predetermined distance.

(2) The controller 191 may control the moving assembly 150 to control escape while performing the backward movement, and checks the presence or absence of an obstacle in the lateral direction by using the obstacle detectors provided on the left and right sides. In this case, backward movement may be performed until no obstacle is detected in the lateral direction. If no obstacle is detected in the lateral direction, it may be determined that the main body is in an escapable state, and the rotation and the forward movement may be performed to bypass the obstacle.

In this case, the controller 191 may rotate the main body in a direction in which no obstacle is detected to bypass the obstacle if no obstacle has been detected in only one direction of the left and right directions of the main body.

In addition, the controller 191 may determine the presence or absence of an obstacle in the lateral direction while traveling in the backward direction by a predetermined distance during control of backward movement.

The storage unit 192 may store a predetermined angle and a predetermined distance for escape when the main body is in a stuck state. In this case, the predetermined angle may be a rotation angle of the main body, and the predetermined distance may be a distance of the backward movement of the main body.

The storage unit 192 may store a diameter of the rotatable space of the main body.

The first driver 193 may drive a pair of wheel motors 153 and 154 based on commands from the controller 191 to rotate and move the main body 110 forward and backward.

The second driver 194 may drive the gear member 164 based on the commands from the controller 191, thereby rotating the drum type pad members 163-1, 163-2 and 163-3.

Figure 7:
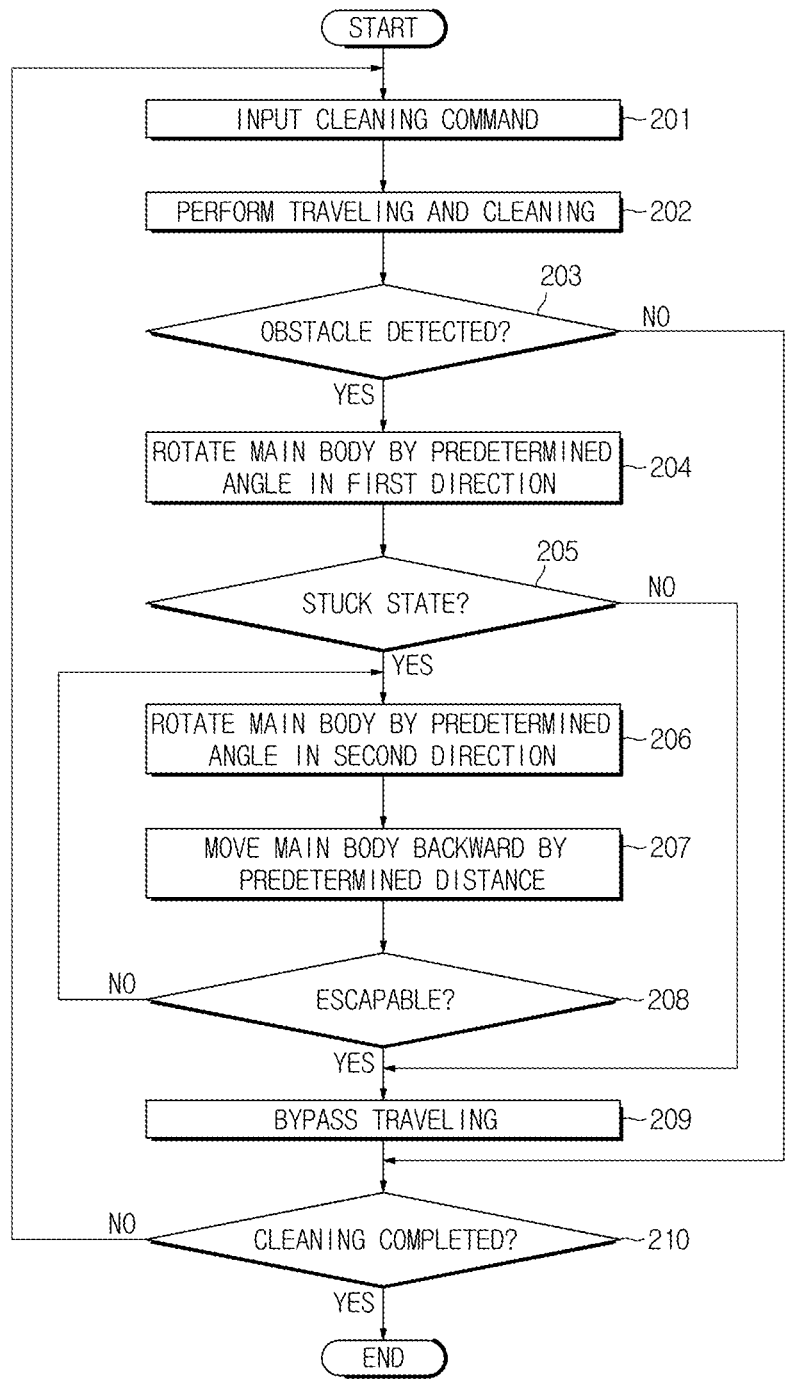
FIG. 7 shows an example of a control flowchart of a cleaning robot according to one or more embodiments.

FIG. 7 is a control flowchart of a cleaning robot according to one or more embodiments, which shows a process in which a stuck state is determined by whether the main body is rotatable, and escape is attempted by rotating and moving the main body backward. This will be described with reference to FIGS. 8 to 10.

When a cleaning command is input to the input unit 121 (operation 201) or at a cleaning reservation time, the cleaning robot may operate the moving assembly and the cleaning tool assembly, thereby possibly performing traveling and cleaning (operation 202).

In addition, during traveling, the cleaning robot may travel in a predetermined traveling pattern based on a random or preset map.

While performing traveling and cleaning, the cleaning robot may detect an obstacle by using the detector 130 (operation 203). In this case, while performing traveling in a forward direction that is a basic traveling direction, i.e., forward movement, the cleaning robot may detect an obstacle located in the forward direction.

In this case, detecting an obstacle located in the forward direction may include detecting the collision with the first bumper mounted on the front surface of the main body, or detecting the presence or absence of an obstacle or a distance to an obstacle.

Upon determining that an obstacle is present in the forward direction, the cleaning robot may rotate the main body 110 by a predetermined angle in the first direction in order to determine that the main body is in a stuck state (operation 204). Then, once rotation of the main body is completed, the cleaning robot may determine whether the main body is in a stuck state due to the obstacle (operation 205).

Determining that the main body is in a stuck state according to the detection results of the obstacle located in the forward direction may vary depending on arrangement of detectors provided on the main body. This will be described in more detail.

Figure 8:
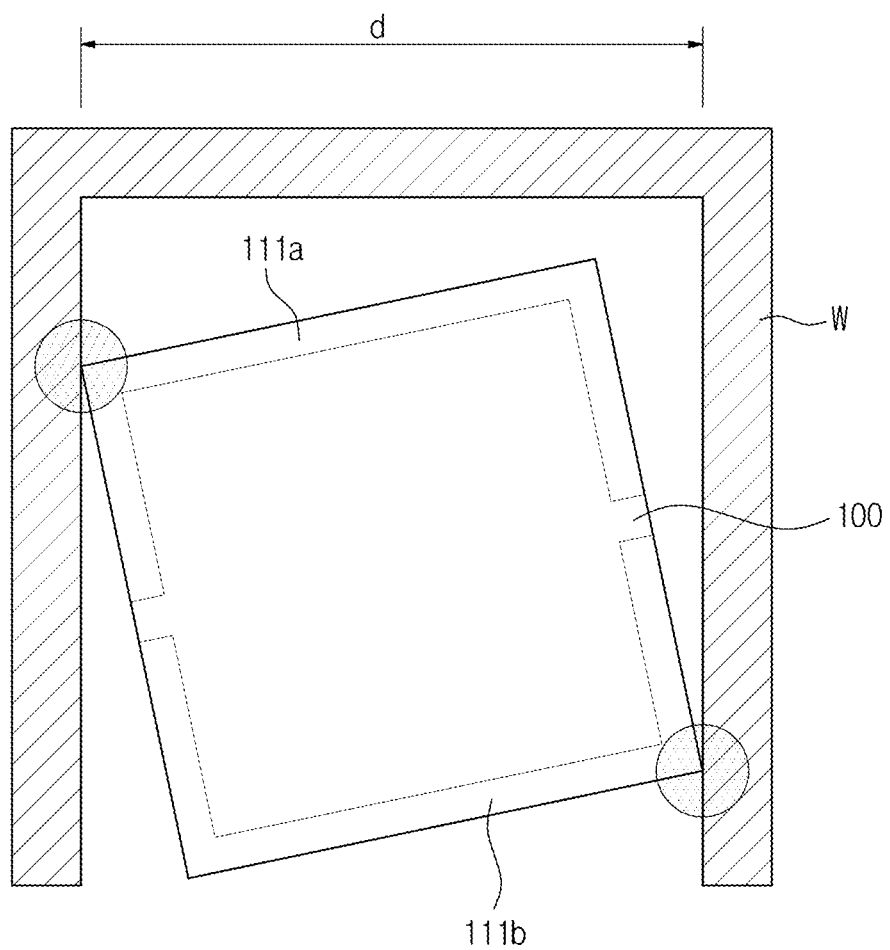
FIGS. 8 to 10 are exemplary diagrams showing control of traveling of a cleaning robot according to one or more embodiments, such as based on the control flowchart of FIG. 7.

(1) When the cleaning robot 100 includes an obstacle detector mounted on the front surface of the main body, and a collision detector to detect collision of the first bumper and the second bumper, the cleaning robot may rotate by a predetermined angle upon receiving an obstacle detection signal from the obstacle detector provided on the front surface of the main body. In this case, as shown in FIG. 8, the cleaning robot may determine that the main body is in a stuck state upon receiving a collision detection signal from the collision detector of the first bumper and the second bumper.

(2) When the cleaning robot 100 includes an obstacle detector mounted on the front surface of the main body and a rotation detector provided on the main body, the cleaning robot may rotate the main body by a predetermined angle upon receiving an obstacle detection signal from the obstacle detector provided on the front surface of the main body. In this case, the cleaning robot may compare a rotation angle detected by the rotation detector with the predetermined angle, and may determine that the main body is in a stuck state when the detected rotation angle is different from the predetermined angle.

(3) When the cleaning robot 100 includes a collision detector to detect the collision of each of the first bumper and the second bumper, the cleaning robot may rotate the main body by a predetermined angle upon receiving a collision detection signal of the first bumper from the collision detector. In this case, the cleaning robot may determine that the main body is in a stuck state upon receiving collision detection signals from both the collision detector of the first bumper and the collision detector of the second bumper.

(4) When the cleaning robot 100 includes a collision detector to detect collision of the first bumper and a rotation detector provided on the main body, the cleaning robot may rotate the main body by a predetermined angle upon receiving a collision detection signal of the first bumper from the collision detector. In this case, the cleaning robot may compare a rotation angle detected by the rotation detector with the predetermined angle, and may determine that the main body is in a stuck state when the detected rotation angle is different from the predetermined angle.

The cleaning robot may determine whether the main body is in a stuck state by using any one of the above methods.

Then, upon determining that the main body is in a stuck state, the cleaning robot may rotate the main body in the second direction opposite to the first direction (operation 206). Once rotation in the second direction is completed, the cleaning robot may operate the moving assembly, thereby moving the main body backward by a predetermined distance (operation 207).

Then, the cleaning robot may determine whether it is possible to escape (operation 208).

In this case, determining whether the main body is escapable may include determining whether the main body is still in a stuck state, and a process of determining whether the main body is rotatable is used.

That is, a process of determining whether the main body is in a stuck state may be repeated to determine whether the main body is escapable.

This will be described with reference to FIG. 9.

Figure 9:
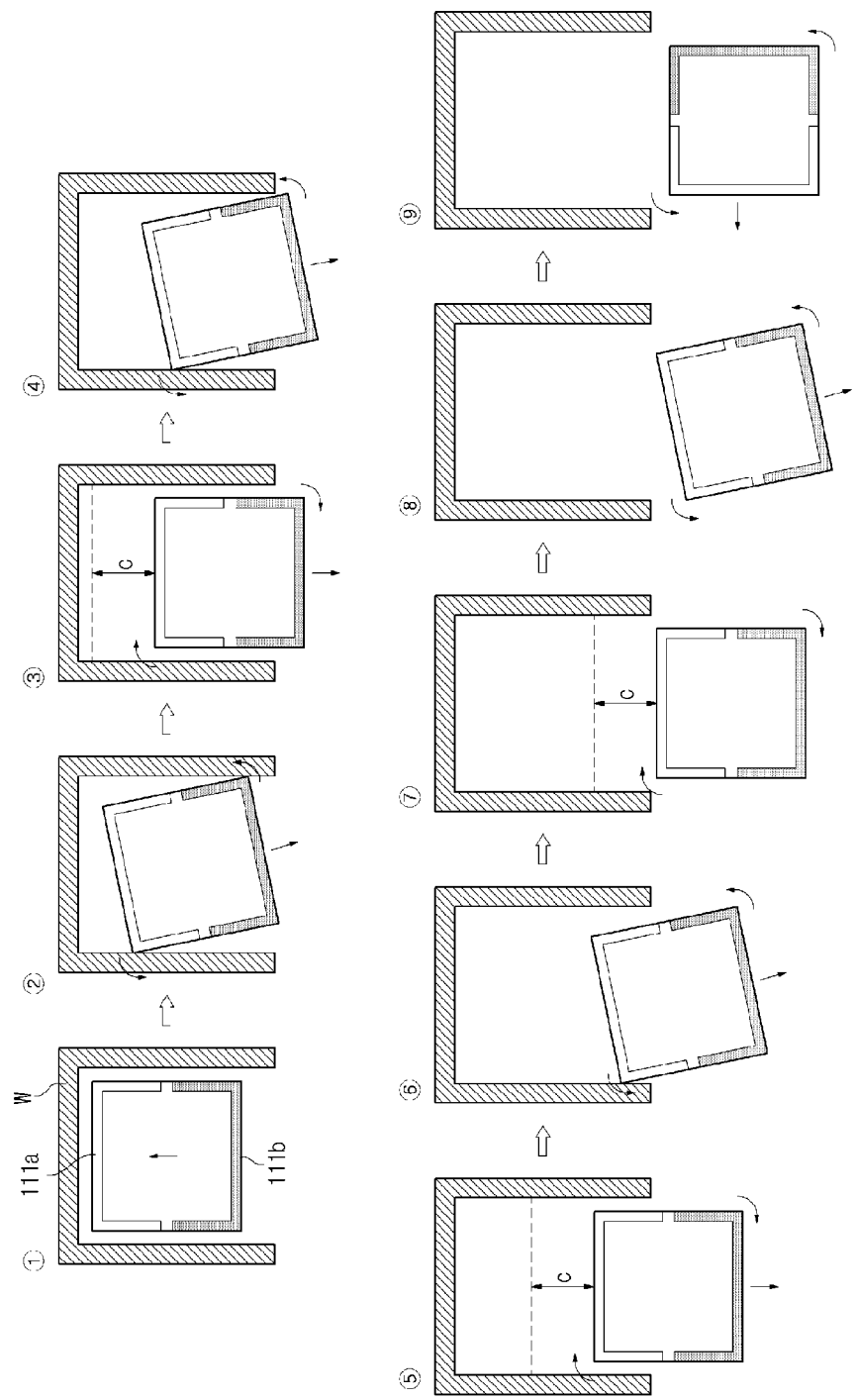

Upon determining that an obstacle is present in the forward direction ((1) of FIG. 9), the cleaning robot may rotate the main body in the first direction by a predetermined angle ((2) of FIG. 9). In this case, if a collision detection signal may be generated due to contact between the obstacle and two bumpers 111a and 111b of the main body, it may be determined that the main body is in a stuck state.

Then, the cleaning robot may rotate the main body in the second direction opposite to the first direction, and once rotation in the second direction is completed, may operate the moving assembly to move the main body backward by a predetermined distance c ((3) of FIG. 9).

Then, in order to determine whether the main body is escapable, the cleaning robot may rotate the main body in the first direction by a predetermined angle ((4) of FIG. 9). In this case, if a collision detection signal is generated due to contact between the obstacle and two bumpers 111a and 111b, it may be determined that the main body is in a stuck state.

Then, the cleaning robot may rotate the main body in the second direction, and when the rotation in the second direction is completed, may operate the moving assembly to move the main body backward by a predetermined distance c ((5) of FIG. 9).

Then, in order to determine whether the main body is escapable, the cleaning robot may rotate the main body in the first direction by a predetermined angle ((6) of FIG. 9). In this case, if a collision detection signal is generated due to contact between the obstacle and two bumpers 111a and 111b, it may be determined that the main body is in a stuck state.

As described above, the cleaning robot may periodically check whether the main body may escape from the internal space formed in the obstacle through the rotation of the main body while periodically attempting to rotate the main body.

Then, the cleaning robot may rotate the main body in the second direction, and when the rotation in the second direction is completed, may operate the moving assembly to move the main body backward by a predetermined distance c ((7) of FIG. 9).

Then, in order to determine whether the main body is escapable, the cleaning robot may rotate the main body in the first direction by a predetermined angle ((8) of FIG. 9). In this case, the main body of the cleaning robot is not in contact with the obstacle, and a collision detection signal of the bumper is not generated through the detector. Accordingly, the cleaning robot may determine that the main body may escape from the internal space formed in the obstacle.

Then, the cleaning robot may determine whether the obstacle is present in the forward direction while rotating the main body. If no obstacle is present in the forward direction, the cleaning robot stops rotation and may perform forward movement to bypass the obstacle ((9) of FIG. 9).

In addition, when the main body is rotated by a predetermined angle to determine whether the main body is escapable, if a collision detection signal is detected by the detector mounted on the first bumper or the second bumper, traveling may be performed in the direction of the bumper which has not detected collision. This will be described with reference to FIG. 10.

Figure 10:
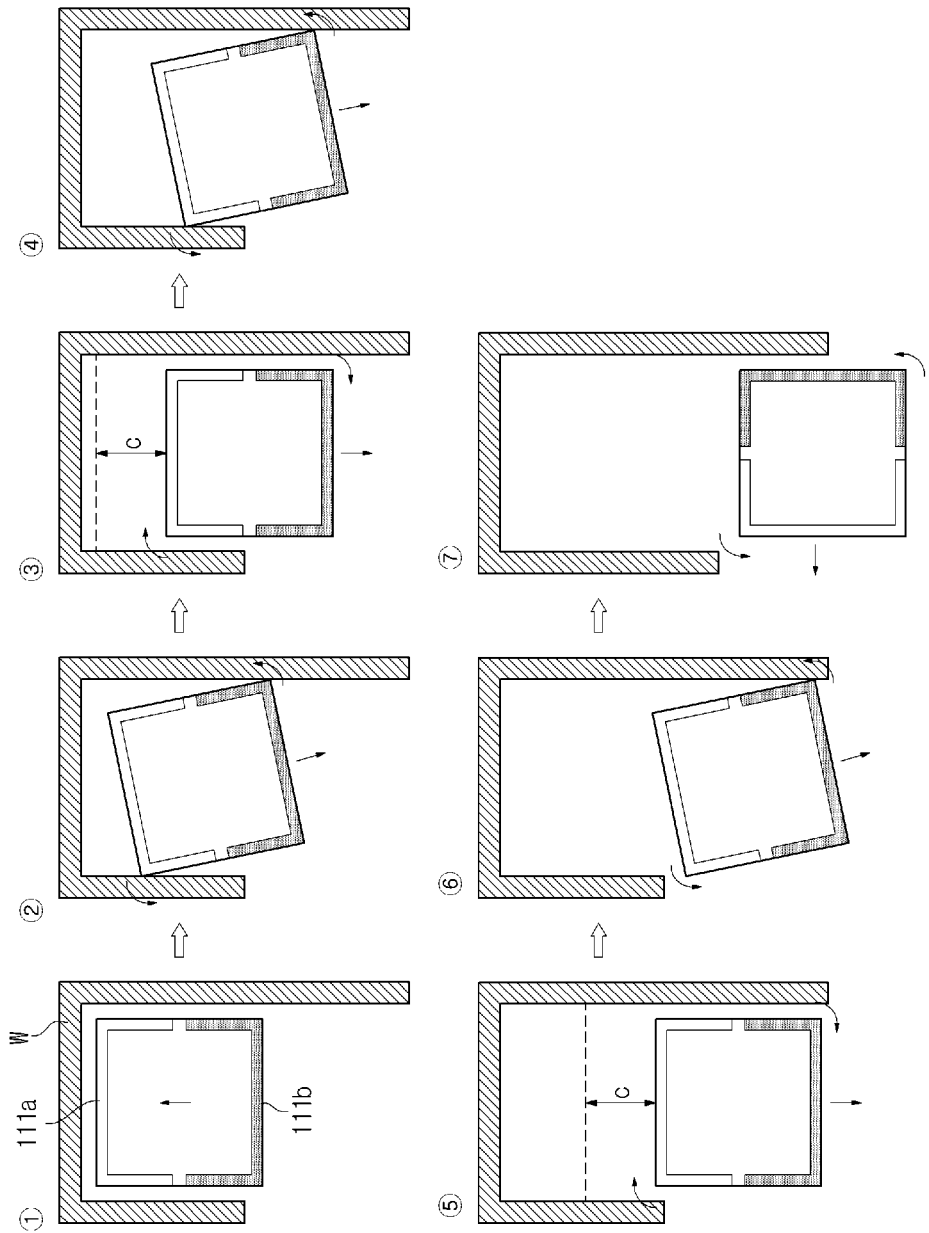

Upon determining that an obstacle W is present in the forward direction ((1) of FIG. 10), the cleaning robot may rotate the main body in the first direction by a predetermined angle ((2) of FIG. 10). In this case, if a collision detection signal is generated due to contact between the obstacle and two bumpers 111a and 111b of the main body, it may be determined that the main body is in a stuck state.

Then, the cleaning robot may rotate the main body in the second direction opposite to the first direction, and when rotation in the second direction is completed, may operate the moving assembly to move the main body backward by a predetermined distance c ((3) of FIG. 10).

Then, in order to determine whether the main body is escapable, the cleaning robot may rotate the main body in the first direction by a predetermined angle ((4) of FIG. 10). In this case, if a collision detection signal is generated due to contact between the obstacle and two bumpers 111a and 111b, it may be determined that the main body is in a stuck state.

Then, the cleaning robot may rotate the main body in the second direction, and, once rotation in the second direction is completed, may operate the moving assembly to move the main body backward by a predetermined distance c ((5) of FIG. 10).

Then, in order to determine whether the main body is escapable, the cleaning robot may rotate the main body in the first direction by a predetermined angle ((6) of FIG. 10). In this case, if a collision detection signal is generated in the detector provided in the second bumper due to contact between the obstacle and the second bumper 111b and no collision detection signal is generated in the detector provided in the first bumper 111a, it may be determined that the main body is in an escapable state, and it may be determined that it is impossible to escape in a right direction in which the obstacle having come into contact with the second bumper is located.

Accordingly, the cleaning robot may rotate the main body in the first direction such that the front surface of the main body is oriented to the left ((7) of FIG. 10). In this case, upon determining that there is no obstacle in the forward direction of the main body, the cleaning robot may stop rotation and may perform forward movement to bypass the obstacle.

Through this process, the cleaning robot stuck in the internal space formed in the obstacle may escape from the internal space formed in the obstacle.

That is, in a state wherein the main body is rotated in the first direction by a predetermined angle, the cleaning robot may operate the moving assembly to rotate the main body until no obstacle is detected in the forward direction. If there is no obstacle in the forward direction, bypass traveling may be performed by performing forward movement to bypass the obstacle (operation 209).

In addition, in the state wherein the main body is rotated in the first direction by a predetermined angle, if no obstacle has been detected in the forward direction, additional rotation may be omitted and forward movement may be performed.

If an obstacle is detected in the forward direction, but it is determined that the main body is not in a stuck state, the cleaning robot may rotate the main body to perform bypass traveling. In this case, the cleaning robot may rotate in a direction in which an obstacle is not detected.

When determining whether the main body is in a stuck state and when determining whether the main body is in an escapable state, the cleaning robot may operate or stop the cleaning tool assembly.

During traveling and cleaning, the cleaning robot may determine whether cleaning is completed (operation 210), and may control docking with the recharging base upon determining that cleaning has been completed.

In addition, when cleaning has been completed, or when remaining battery charge falls below a reference level, the cleaning robot 100 may perform charging by docking with the recharging base (not shown), and receiving power from the recharging base (not shown) once docked.

Figure 11:
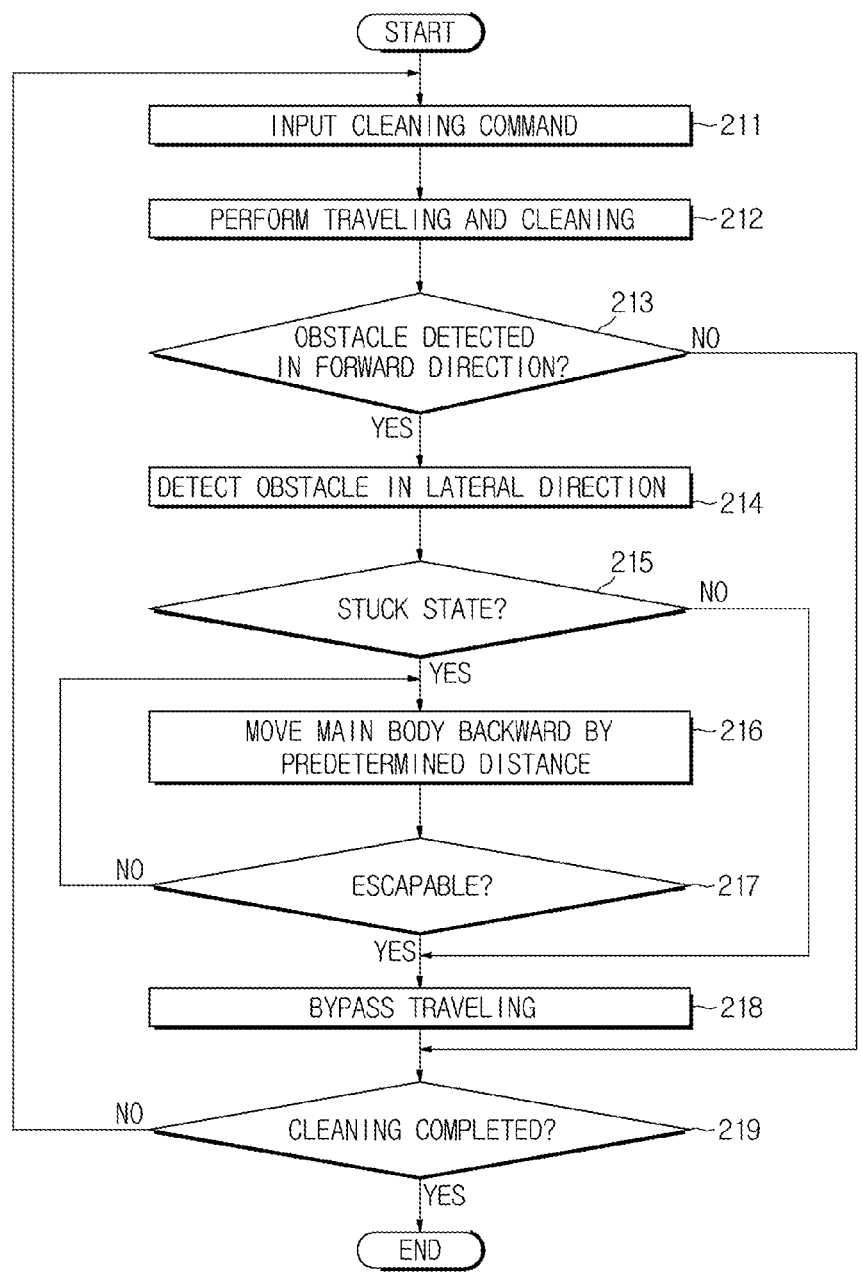
FIG. 11 shows another example of a control flowchart of a cleaning robot according to one or more embodiments.

FIG. 11 is a control flowchart of a cleaning robot according to one or more embodiments, which shows a process in which whether the main body is in a stuck state is determined based on a distance to an obstacle in the forward and lateral direction, and escape is attempted based on a distance to an obstacle in the lateral direction. This will be described with reference to FIG. 12.

When a cleaning command is input to the input unit 121 (operation 211) or at a cleaning reservation time, the cleaning robot may operate the moving assembly and the cleaning tool assembly, thereby possibly performing traveling and cleaning (operation 212).

In addition, during the traveling, the cleaning robot may travel in a predetermined traveling pattern based on a random or preset map.

While performing traveling and cleaning, the cleaning robot may detect an obstacle located in the forward direction by using the detector 130 that may be mounted on the front surface of the main body (operation 213).

In this case, detecting an obstacle located in the forward direction may include detecting collision with the first bumper mounted on the front surface of the main body, or detecting the presence or absence of an obstacle or a distance to an obstacle.

Upon determining that an obstacle is present in the forward direction, the cleaning robot may detect an obstacle located in the lateral direction using the detector mounted on the left and/or right sides of the main body in order to determine that the main body is in a stuck state (operation 214).

In this case, the cleaning robot may acquire a distance to the obstacle in the lateral direction by using an obstacle detection signal that may be detected by the detector on the left and/or right sides, and may calculate a distance of the internal space formed in the obstacle based on the acquired distance to the obstacle in the lateral direction. Then, the cleaning robot may compare the calculated distance of the internal space formed in the obstacle with the preset diameter of the rotatable space of the main body, and may determine whether the main body is in a stuck state (operation 215). That is, the cleaning robot may determine that the main body is in a stuck state if the distance of the internal space formed in the obstacle is shorter than the diameter of the rotatable space.

Then, upon determining that the main body is in a stuck state, the cleaning robot may operate the moving assembly to move the main body backward by a predetermined distance (operation 216).

Then, the cleaning robot may determine whether the main body is escapable (operation 217).

In this case, determining whether the main body is escapable may include determining whether the main body is still in a stuck state, and a process of acquiring a distance to the obstacle is used.

That is, a process of determining whether the main body is in a stuck state may be repeated to determine whether the main body is escapable.

This will be described with reference to FIG. 12.

Figure 12:
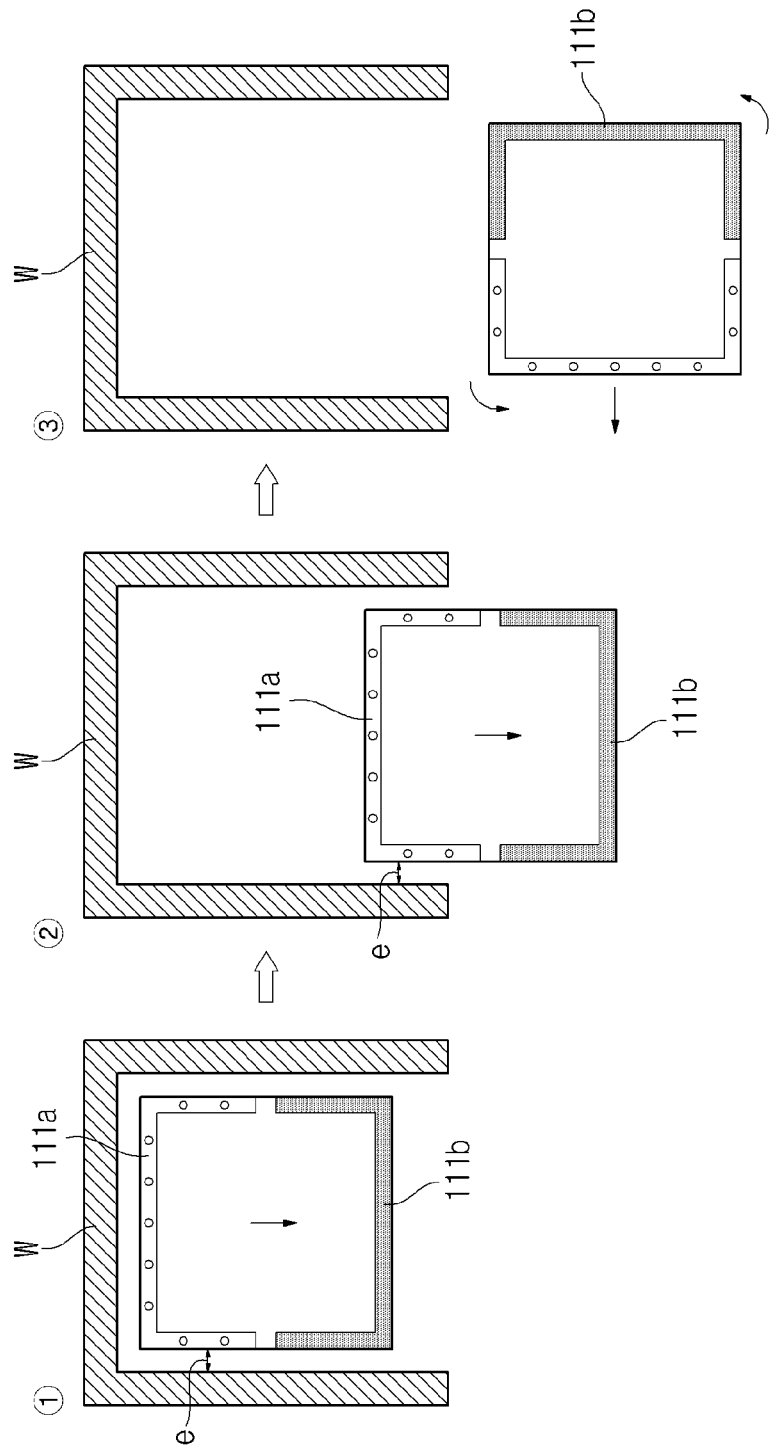
FIG. 12 is an exemplary diagram showing control of traveling of a cleaning robot according to one or more embodiments, such as based on the control flowchart of FIG. 11.

Upon determining that an obstacle is present in the forward direction ((1) of FIG. 12), the cleaning robot may move the main body backward by a predetermined distance by operating the moving assembly ((2) of FIG. 12). Once backward movement is completed, the obstacle located in the lateral direction of the main body may be detected using the detector mounted on the left and/or right sides of the main body.

In this case, the cleaning robot may acquire a distance e to the obstacle in the lateral direction by using the detected obstacle detection signal, and may calculate a distance of the internal space formed in the obstacle based on the acquired distance to the obstacle in the lateral direction. The cleaning robot may compare the calculated distance of the internal space formed in the obstacle with the preset diameter of the rotatable space of the main body, and may determine whether the main body is in a stuck state.

That is, the cleaning robot may determine that the main body is in a stuck state if the distance of the internal space formed in the obstacle is shorter than the diameter of the rotatable space.

Then, upon determining that the main body is in a stuck state, the cleaning robot may move the main body backward by a predetermined distance by operating the moving assembly ((3) of FIG. 12). When backward movement is completed, after an obstacle located in the lateral direction is detected using the detector mounted on the left and/or right sides of the main body, a distance to the obstacle in the lateral direction may be acquired by the detected obstacle detection signal.

As shown in (3) of FIG. 12, the cleaning robot is in a state of having escaped from the internal space formed in the obstacle, and an obstacle is not detected through the detector provided at the left and right sides. That is, a distance to the obstacle located in the lateral direction is not acquired.

Thus, the cleaning robot may determine that the cleaning robot is escapable from the internal space formed in the obstacle, and may determine whether an obstacle is present in the forward direction while rotating the main body. If no obstacle is present in the forward direction, the cleaning robot may stop the rotation and may perform forward movement, thereby possibly performing bypass traveling to bypass the obstacle (operation 218).

If an obstacle is detected in the forward direction, but it is determined that the main body is not in a stuck state, the cleaning robot may rotate the main body to perform bypass traveling. In this case, the cleaning robot may rotate in a direction in which an obstacle is not detected.

When determining whether the main body is in a stuck state and when determining whether the main body is in an escapable state, the cleaning robot may operate or stop the cleaning tool assembly.

During the traveling and cleaning, the cleaning robot may determine whether cleaning is completed (operation 219), and may control docking with the recharging base upon determining that cleaning has been completed.

In addition, when cleaning has been completed, or when remaining battery charge falls below a reference level, the cleaning robot 100 may perform charging by docking with the recharging base (not shown), and receiving power from the recharging base (not shown) once docked.

As is apparent from the above description, the cleaning robot may escape to the outside from the confined space by performing continuous backward movement in a situation wherein the main body of the cleaning robot may not move. Further, it may be determined whether the cleaning robot is in a stuck state by utilizing a small number of sensors, and the cleaning robot may bypass an obstacle while performing backward movement in the stuck state, thereby possibly improving traveling performance and reducing manufacturing costs.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A cleaning robot comprising:
a main body;
a moving assembly mounted on a bottom surface of the main body to move the main body;
a cleaning tool assembly mounted on the bottom surface of the main body to clean a floor;
a detector to detect whether the main body is in a stuck state of being stuck in an internal space that is at least partially defined by an obstacle; and
a controller to control a backward movement of the main body upon determining that the main body is in the stuck state based on a detection signal of the detector,
wherein the backward movement allows the main body to move in a direction opposite to a direction when entering into the internal space, which is at least partially defined by the obstacle,
wherein when controlling the moving assembly, the controller controls rotation of the main body by a predetermined angle to re-determine whether the main body is in the stuck state, determines that the main body is in the stuck state and cannot escape from the stuck state when the obstacle is detected in the forward and backward directions of the main body, determines that the main body can escape from the stuck state when no obstacle is detected in at least one of the forward and backward directions of the main body, and controls bypass traveling when the main body can escape from the stuck state.

2. The cleaning robot according to claim 1, wherein a size of the main body is less than a size of a rotation space required for rotation.

3. The cleaning robot according to claim 1, wherein the detector comprises a distance detector to detect a distance to an obstacle, and at least one collision detector, on each of front and rear surfaces of the main body, to detect collision with an obstacle, and
wherein the controller determines whether an obstacle is present in a forward direction based on a detection signal detected by the distance detector, rotates the main body by the predetermined angle when the obstacle is present in the forward direction, and determines that the main body is in a stuck state upon receiving a detection signal from the at least one collision detector.

4. The cleaning robot according to claim 1, wherein the detector comprises at least one collision detector to detect collision with an obstacle on each of front and rear surfaces of the main body, and
wherein the controller determines whether an obstacle is present in a forward direction based on a detection signal detected by the collision detector of the front surface of the main body, rotates the main body by the predetermined angle when the obstacle is present in the forward direction, and determines that the main body is in a stuck state upon receiving a detection signal from the collision detectors on the front and rear surfaces.

5. The cleaning robot according to claim 1, wherein the controller determines whether the main body can escape from the stuck state by repeating the backward movement and performing a re-determination.

6. The cleaning robot according to claim 5, wherein when re-determining whether the main body is in a stuck state, the controller determines that the main body can escape from the stuck state when the main body is rotatable by an angle equal to or greater than the predetermined angle, and controls rotation and straight movement of the main body to bypass the obstacle.

7. The cleaning robot according to claim 5, wherein the controller controls rotation of the main body by the predetermined angle in a direction opposite to a direction in which the main body is rotated by the predetermined angle before the backward movement.

8. A method for controlling a cleaning robot including a main body comprising:
determining whether an obstacle is present in front of the main body in a traveling direction while performing traveling and cleaning;
determining whether the main body is in a stuck state of being stuck in an internal space that is at least partially defined by an obstacle upon determining that the obstacle is present; and
moving the main body backward in a direction opposite to the traveling direction of the main body to perform an attempt to escape from the internal space, which is at least partially defined by the obstacle, upon determining that the main body is in the stuck state,
wherein the performing the attempt to escape comprises:
rotating the main body by a predetermined angle,
determining that the main body is in a stuck state and cannot escape from the stuck state when an obstacle is detected in the forward and backward directions of the main body,
determining that the main body can escape from the stuck state when no obstacle is detected in at least one of the forward and backward directions of the main body, and
controlling bypass traveling when the main body can escape from the stuck state.

9. The method according to claim 8, wherein the detecting the obstacle comprises:
detecting at least one of a contact with the obstacle and a distance to the obstacle.

10. An autonomous robot comprising:
a main body;
a moving assembly mounted on a bottom surface of the main body to move the main body;
a detector to detect whether the main body is in a stuck state of being stuck in an internal space that is at least partially defined by an obstacle; and
a controller to control the moving assembly such that the main body travels in a direction opposite to a direction when entering into the internal space, which is at least partially defined by the obstacle, upon determining that the main body is in the stuck state based on a detection signal of the detector,
wherein when controlling the moving assembly, the controller controls rotation of the main body by a predetermined angle to re-determine whether the main body can escape from the stuck state, determines that the main body is in the stuck state and cannot escape from the stuck state when the obstacle is detected in the forward and backward directions of the main body, determines that the main body can escape from the stuck state when no obstacle is detected in at least one of the forward and backward directions of the main body, and controls bypass traveling when the main body can escape from the stuck state.

11. The autonomous robot according to claim 10, wherein the detector comprises a distance detector to detect a distance to an obstacle, and at least one collision detector, on each of front and rear surfaces of the main body, to detect collision with an obstacle, and wherein the controller determines whether an obstacle is present in a forward direction based on a detection signal detected by the distance detector, rotates the main body by the predetermined angle when the obstacle is present in the forward direction, and determines that the main body is in a stuck state upon receiving a detection signal from the at least one collision detector.

12. The autonomous robot according to claim 10, wherein the detector comprises at least one collision detector, on each of front and rear surfaces of the main body, to detect collision with an obstacle, and wherein the controller determines whether an obstacle is present in a forward direction based on a detection signal detected by the collision detector of the front surface of the main body, rotates the main body by the predetermined angle when the obstacle is present in the forward direction, and determines that the main body is in a stuck state upon receiving a detection signal from the collision detectors on the front and rear surfaces.

* * * * *